United States Patent [19]

Sherman, Jr. et al.

[11] 4,432,120
[45] Feb. 21, 1984

[54] CAP RETAINING DEVICE

[76] Inventors: Benjamin F. Sherman, Jr., 6329 Mori St.; Samuel Francis, 1202 Perry William Rd., both of McLean, Va. 22101

[21] Appl. No.: 404,650

[22] Filed: Aug. 3, 1982

[51] Int. Cl.³ .............................................. B65D 55/16
[52] U.S. Cl. ........................................ 24/299; 24/304; 24/116 A; 220/375; 222/543
[58] Field of Search ............. 222/543; 24/116 A, 303, 24/304, 298, 299; 220/375

[56] References Cited

U.S. PATENT DOCUMENTS

| 1,769,245 | 7/1930 | Tregoning | 24/116 A |
| 1,934,334 | 11/1933 | Schumann | 220/375 |
| 1,937,535 | 12/1933 | Soucek | 220/375 |
| 2,226,464 | 12/1940 | Gora | 24/116 A |
| 2,522,516 | 9/1950 | Jablon | 24/116 A |
| 2,641,809 | 6/1953 | Kimball | 24/299 |
| 2,844,275 | 7/1958 | Keller | 220/375 |
| 2,962,784 | 12/1960 | Gianios | 24/299 |
| 3,306,483 | 2/1967 | Bellafiore | 24/304 |
| 3,657,774 | 4/1972 | Reynolds | 24/298 |

Primary Examiner—Paul J. Hirsch
Attorney, Agent, or Firm—Anthony A. O'Brien

[57] ABSTRACT

An automobile fuel tank cap retaining device includes a flexible member interconnecting a pair of mounting ends having adhesive surfaces. One end of the device can be adhesively secured to a cap and the other end to a stationary surface so that when the cap is removed from its reservoir inlet the cap will hang adjacent thereto.

1 Claim, 6 Drawing Figures

CAP RETAINING DEVICE

BACKGROUND OF THE INVENTION

1. Field of the Invention

The invention relates to cap retaining devices and particularly to a device for interconnecting an automobile fuel cap with the automobile body so that the cap is not forgotten and lost after a refueling operation.

2. Description of the Prior Art

Many motorists have been faced with the problem of lost fuel caps. Often a gas station attendant will inadvertently forget to replace the cap after a refueling operation, or with the recent advent of self-serve installations, the motorist will forget to replace the cap and leave it on the dispensing island. More often than not, the absence of the cap is not realized until the next refueling stop and by that time the cap is usually lost, requiring the motorist to buy another. In addition, driving the car without a fuel cap presents an unsafe and dangerous condition.

Numerous closure retaining devices are known in the prior art. An example in U.S. Pat. No. 1,518,467 to Van Pelt which discloses a closure cap anchor 17 that is connected to a cap 12 via a flexible element 16. A pair of hooked terminals 20 on the anchor 17 are adapted to engage the internal flange of a filling nozzle 11 to prevent loss of the cap 12.

U.S. Pat. No. 1,934,334 to Schumann reveals a closure retainer similar to Van Pelt which utilizes a U-shaped clip 30 and a resilient expansible band 31 which are interconnected by a flexible element 32.

Further prior art teachings are shown in U.S. Pat. No. 1,937,535 and U.S. Pat. No. 2,844,275 which reveal closure caps connected to reservoir openings by flexible chains.

SUMMARY OF THE INVENTION

A cap retaining device for the fuel tank of an automobile in accordance with the invention includes a first mounting end having a first support layer and a first adhesive layer, a second mounting end having a second support layer and a second adhesive layer, an elongate flexible member having terminal portions at proximal and distal ends thereof, each of the terminal portions being connected to a respective one of the first and second mounting ends, and wherein the first mounting end is adapted to be secured to a fuel tank cap by the first adhesive layer and the second mounting end is adapted to be secured to a surface of the automobile adjacent the cap by the second adhesive layer.

An object of the invention is to provide a cap retaining device which can be quickly and easily attached to an automobile fuel cap without the need for drilling or special tools.

Another object of the invention is to provide a cap retaining device which can be manufactured inexpensively from readily available materials.

A further object of the invention is to provide a cap retaining device which can be removed temporarily and then easily replaced.

An advantage of the cap retaining device is that it can be used with virtually any type of automobile, regardless of the type and location of the fuel cap.

Other objects and advantages of the invention will become apparent from the following description of the preferred embodiments taken in conjunction with the accompanying drawings.

DESCRIPTION OF THE PREFERRED EMBODIMENT

Figure 1:
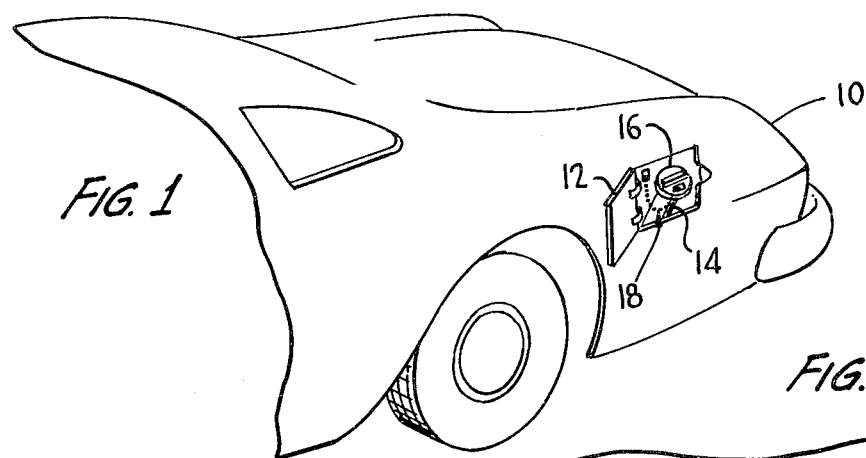
FIG. 1 is a pictorial view of a rear portion of an automobile showing the invention adjacent the fuel tank cap of an automobile.
Figure 2:
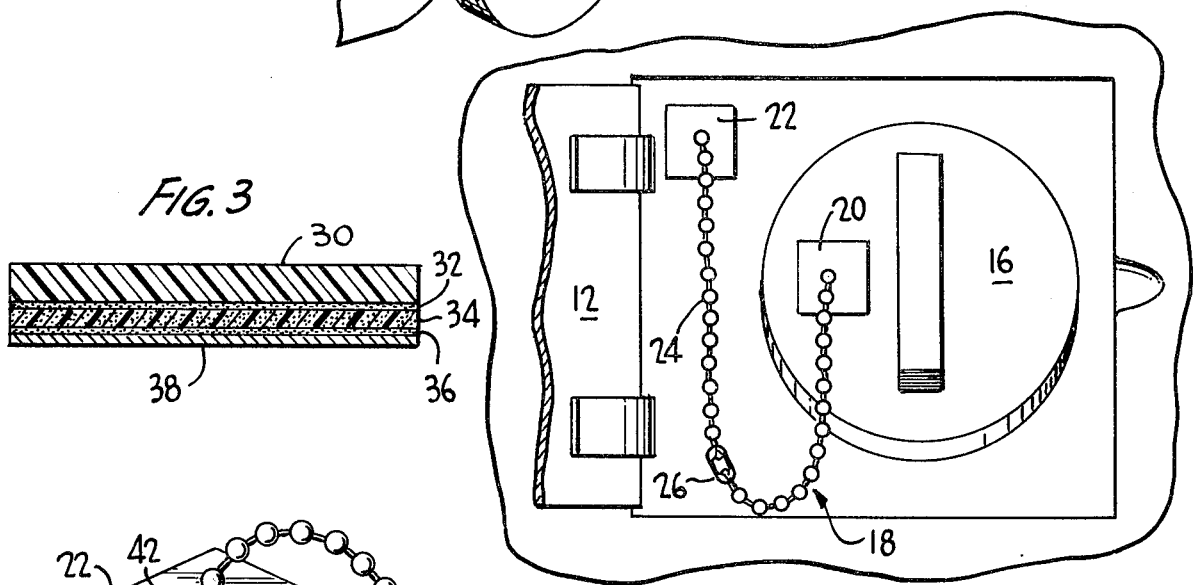
FIG. 2 is an enlarged plan view of a broken away portion of the automobile of FIG. 1.

As illustrated in FIGS. 1 and 2, a rear portion of a conventional automobile body 10 includes a pivotal hatch 12 for providing access to a fuel inlet 14 of a fuel tank (not shown) of an automobile. A fuel cap 16 is secured atop the inlet 14 to prevent both moisture from entering the tank and fuel from splashing out of the tank. A cap retaining device, designated generally as 18, is shown attached at a first mounting end 20 to the cap 16 and at an other mounting end 22 to the automobile body 10. The ends 20 and 22 are interconnected by a flexible member 24, shown illustratively as a bead chain. As shown in the drawings, the length of the chain 24 is sufficient to allow the cap 16 to be rotated about the inlet 14 when removing and replacing the cap 16. The device 18 can be supplied with an overlong chain 24 to allow the user flexibility in the placement of the ends 20 and 22. The chain 24 includes a coupling member 26, shown as a splicing link, near the midpoint of its length so that the length of the chain 24 can be shortened by uncoupling the splicing link 26, cutting several of the beads from the chain 24 and reconnecting the link 26. The chain 24 allows the cap 16 to be removed from the inlet 14 during a refueling operation and hang adjacent the inlet 14. At the completion of the refueling operation, the cap 16 is conveniently located near the inlet 14 and can be replaced. In the event that it is desired to completely remove the cap, the chain 24 can be uncoupled at the splicing link 26. While the flexible member 24 is shown as a bead chain, it should be understood that any type of flexible cable would be suitable.

Figure 3:
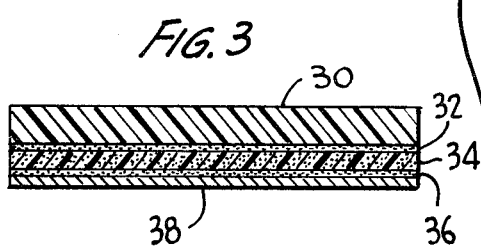
FIG. 3 is a cross-section view of an end portion of the cap retaining device in accordance with the invention.

Referring now to FIG. 3, the end 22 of the device 18 for affixing the device 18 to the automobile is shown. It is understood that the ends 20 and 22 are identical and the description of the end 22 is also applicable to the end 20. The end 22 is a multilayered device having a support layer 30 which is preferably formed of nylon. Below the support layer 30 is a thin adhesive layer 32 which secures a layer of resilient foam 34 to the support layer 30. A second thin layer of adhesive 36 is located below the foam layer 34 and is covered by a paper patch 38 which prevents the adhesive layer 36 from adhering to any surfaces prior to application in its intended use. In the preferred embodiment, the layers 32, 34, 36 and 38 are formed from a single stock. A double stick tape may be used in place of the layers 32, 34, 36 and 38, in which arrangement, the ends 20 and 22 are formed by applying such tape to a surface of the support layer 30. It is to be noted that the adhesive layers 32 and 36 are not visible in FIGS. 4, 5 and 6.

Figure 4:
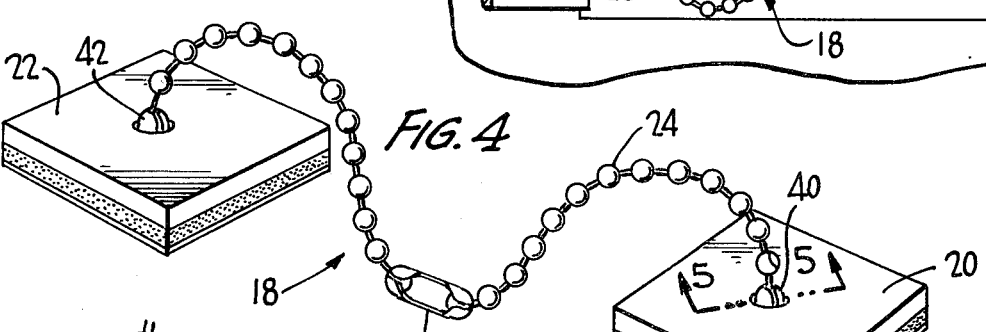
FIG. 4 is a perspective view of the cap retaining device in accordance with the invention.
Figure 5:
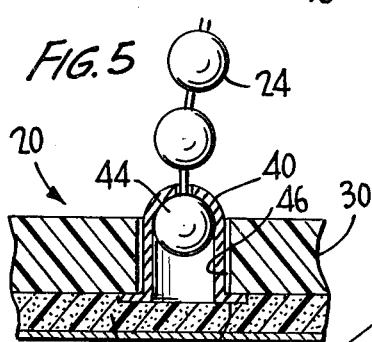
FIG. 5 is a cross-section view taken along the line 5—5 of FIG. 4.

The cap retaining device 18 is shown in more detail in perspective in FIG. 4, where the ends 20 and 22 are interconnected by the chain 24 which includes the splicing link 26 therein. The two ends 20 and 22 are connected to the chain 24 by a respective pair of terminal portions 40 and 42, shown illustratively as bell shaped sleeves. The connection of the sleeve 40 to the end 20, this connection being identical to that between the sleeve 42 to the end 22, is shown in FIG. 5 which is a cross-sectional view taken along then line 5—5 of FIG. 4. The sleeve 40 retains the last bead 44 of the chain 24 in an aperture 46 which is pre-formed in the support layer 30. The diameter of the aperture 46 is sized such that it is slightly greater than the outer diameter of the body of the sleeve 40 so that the sleeve 40 can readily slide through the aperture 46. To retain the sleeve 40 in the aperture 46, an annular flange 48 is provided at the bottom end of the sleeve 40 which abuts against the support layer 30. After the foam layer 34 is applied to the bottom of the support layer 30, the sleeve 40 is held in the aperture 46 by the foam layer 34 bearing against the flange 48.

In constructing the cap retaining device 18, two end portions are formed separately and then joined by the splicing link 26. For example, in forming the end 20 a length of bead chain having a bell sleeve 40 on one end is inserted through the aperture 46 in the support layer 30. The chain is pulled through the aperture 46 until the sleeve flange 48 abuts the support 30. A double stick foam tape is the applied to the support layer 30 and bears against the flange 48 thus preventing any movement of the sleeve 40 back through the aperture 46. The end 22 is formed in an identical manner to the end 20 so that the two bead chains extending from the ends 20 and 22 can be joined by the splicing link 26 to form a complete cap retaining device 18.

The cap retaining device 18 can be easily attached to virtually any type of automobile fuel cap since it requires no drilling or special tools. This makes the device 18 particularly easy to install without any special tools and without any special skill. In order to install the device 18, it is only necessary to peel the paper patches 38 off the ends 20 and 22 thus exposing the adhesive layers 36 and adhere one of the ends 20 or 22 to the fuel tank cap and the other end to an adjacent surface of the automobile body adjacent the inlet 14. This ease of use of the device 18 is the same regardless of the application.

Figure 6:
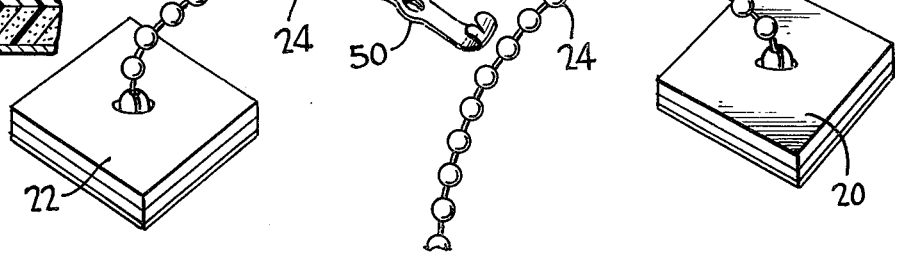
FIG. 6 is a perspective view of another embodiment of the cap retaining device in accordance with the invention.

Referring now to FIG. 6, an alternative embodiment of the cap retaining device 18 is illustrated. The ends 20 and 22 are interconnected by the bead chain 24 by means of a coupling hook 50. The coupling hook 50 engages one bead in the chain 24 securely but it may be unhooked readily. This allows the length of the chain 24 to be quickly and easily adjusted without the need for cutting the chain as is necessary with the splicing link 26.

The device 18 can be attached to an automobile by first cleaning the surfaces to which the ends 20 and 22 are to be attached and then removing the paper patch 38 from each of the adhesive layers 36 on the ends 20 and 22 to expose the adhesive. The ends 20 and 22 can then be secured in their respective positions on the automobile, i.e. the end 20 can be secured to the fuel cap and the end 22 can be secured to the automobile body.

It should be understood that while the device 18 as shown in the drawing figures is applied to an automobile fuel tank cap, numerous other applications of the invention are possible. For example, the device could be used to attach a valve cover oil inlet cap in an automobile engine compartment to the valve cover. Another alternative use includes attaching a cap to a gasoline can. The simplicity of the device and its ease of application allow it to be used in a virtually unlimited number of configurations.

Since many modifications, variations and changes in detail can be made to the disclosed embodiments of the invention, all matter described in the foregoing description and shown in the accompanying drawings should be interpreted as illustrative and not in a limiting sense.

What is claimed is:

1. A cap retaining device for the fuel tank cap of an automobile comprising a first mounting block (20) adapted to be secured to a fuel tank cap (16), a second mounting block (22) adapted to be secured to a surface of an automobile (10) adjacent the fuel tank cap (16), each mounting block (20 and 22) including a support layer (30), a first thin adhesive layer (32) secured to said support layer (30), a layer of resilient foam (34) secured to said first thin adhesive layer (32), a second thin adhesive layer (36) secured to said layer of resilient foam (34) and a paper layer (38) removably secured to said second thin adhesive layer (36), said support layer (30) and said foam layer (34) being permanently secured together as a unit by said first adhesive layer (32), each support layer (30) having a central aperture (46) and a bell-shaped sleeve (40) therein, said bell-shaped sleeve (40) having a closed end, an open end and an outer diameter lesser than the diameter of said central aperture (46) whereby said bell-shaped sleeve (40) extends through said aperture (46) with its closed end protruding out of said aperture (46), an opening in the closed end of said bell-shaped sleeve (40), an annular flange (48) on the open end of said bell-shaped sleeve (40) abutting against the support layer (30) and being retained thereagainst by the first adhesive layer (32) and by the foam layer (34) bearing against said flange (48) whereby said bell-shaped sleeve (40) and the support layer (30) are permanently connected together, an elongate flexible bead chain (24) having one end bead permanently disposed in the bell-shaped sleeve (40) on the first mounting block (20) and an opposite end bead permanently disposed in the bell-shaped sleeve (42) on the second mounting block (22), a splicing link (26) intermediate the ends of said bead chain (24) whereby shortening of said bead chain (24) may be accomplished by cutting several beads therefrom and reconnecting the splicing link (26), said paper layer (38) on said first mounting block (20) being removed from said second thin adhesive layer (36) which is then adhesively applied to a fuel tank cap (16), and said paper layer (38) on said second mounting block (22) being removed from said second thin adhesive layer (36) which is then adhesively applied to an automobile surface adjacent the fuel tank cap (16).

* * * * *